US005788207A

United States Patent [19]
Bunker

[11] Patent Number: 5,788,207
[45] Date of Patent: *Aug. 4, 1998

[54] AUTOMOTIVE TRANSMISSION MOUNT

[76] Inventor: Donald D. Bunker, 28182 Palmada, Mission Viejo, Calif. 92692

[*] Notice: The term of this patent shall not extend beyond the expiration date of Pat. No. 5,551,661.

[21] Appl. No.: 748,505

[22] Filed: Nov. 8, 1996

Related U.S. Application Data

[63] Continuation-in-part of Ser. No. 678,584, Jul. 11, 1996, Pat. No. 5,788,206, which is a continuation-in-part of Ser. No. 322,091, Oct. 11, 1994, Pat. No. 5,551,661.

[51] Int. Cl.$^6$ .................................................. F16M 13/00
[52] U.S. Cl. .......................... 248/634; 248/638; 267/141; 267/153
[58] Field of Search .................................. 248/634, 635, 248/638, 674, 222.3; 180/299, 300, 312, 377; 267/141, 153; 403/220, 221

[56] References Cited

U.S. PATENT DOCUMENTS

| 1,844,735 | 2/1932 | Geyer et al. | |
|---|---|---|---|
| 1,930,310 | 10/1933 | Geyer et al. | |
| 2,138,176 | 11/1938 | Keys | |
| 2,308,962 | 1/1943 | Riesing | |
| 5,031,873 | 7/1991 | Rau | 248/632 |
| 5,215,382 | 6/1993 | Kemeny | |
| 5,295,671 | 3/1994 | Nakagaki et al. | 267/140.13 |
| 5,551,661 | 9/1996 | Bunker | 248/634 |

FOREIGN PATENT DOCUMENTS

| 468165 | 6/1937 | United Kingdom |
| 672578 | 5/1952 | United Kingdom |

Primary Examiner—Ramon O. Ramirez
Assistant Examiner—Derek J. Berger
Attorney, Agent, or Firm—Stetina Brunda Garred & Brucker

[57] ABSTRACT

An automotive transmission mount comprising a top plate which is configured for attachment to a transmission housing and defines top and bottom surfaces. Interlocked to the top plate is a bottom plate which is configured for attachment to a vehicle frame. Disposed between the top and bottom plates is a resilient material which includes an upper section positioned between the top and bottom surfaces of the top plate. The transmission mount further comprises a compression plate which is configured to be positioned between the top plate and the transmission housing. The compression plate is used to compress the upper section of the resilient material so as to apply a pre-load to the bottom plate when the transmission mount is attached to the transmission housing.

17 Claims, 2 Drawing Sheets

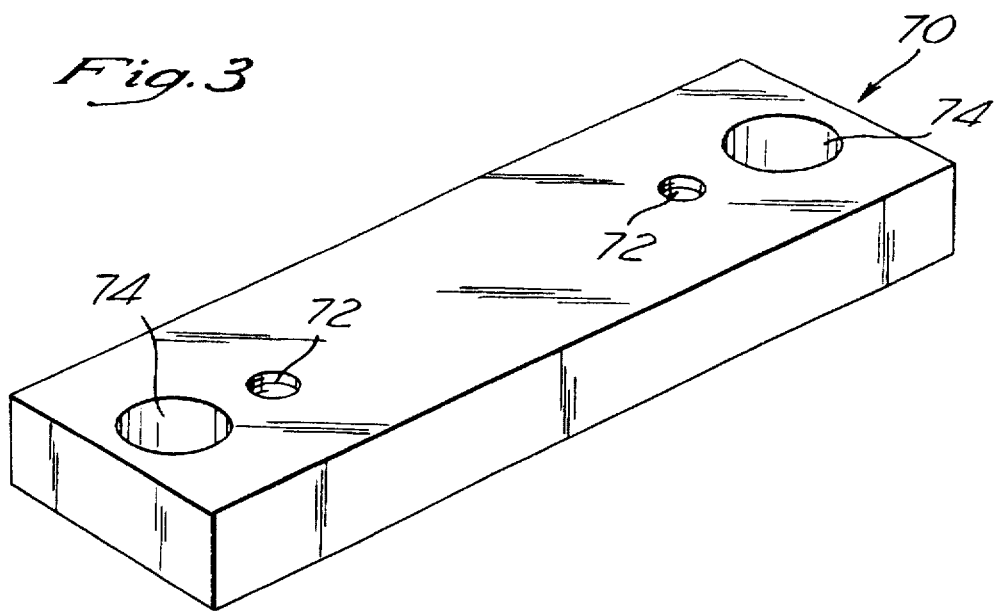
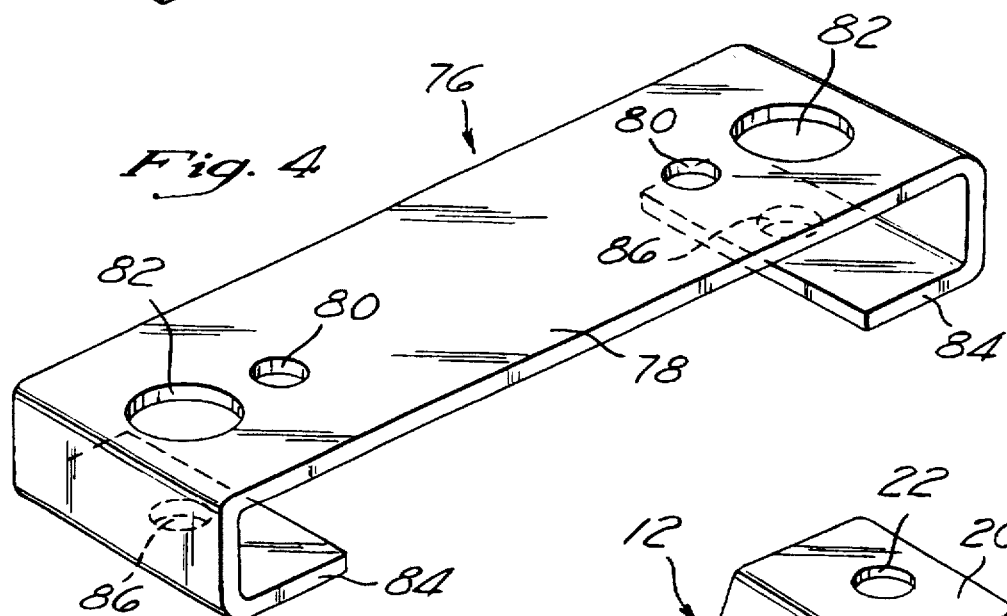
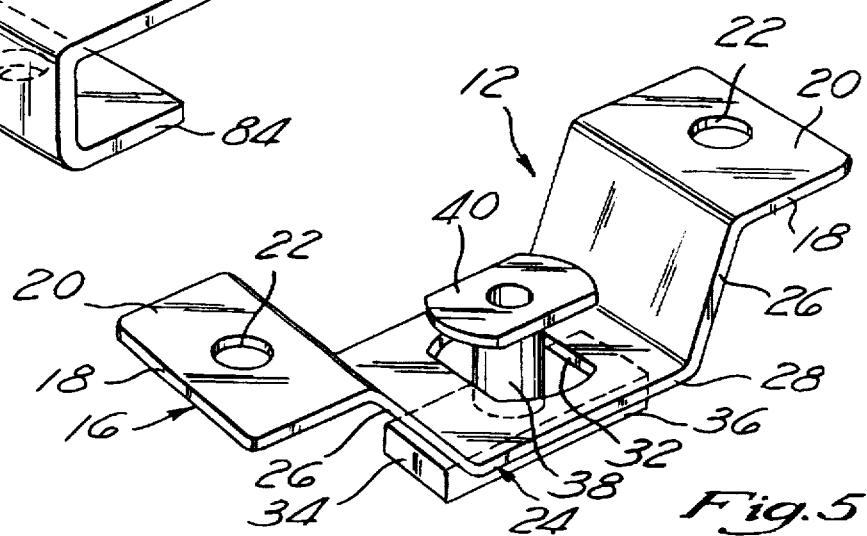

AUTOMOTIVE TRANSMISSION MOUNT

FIELD OF THE INVENTION

The present application is a continuation-in-part of U.S. application Ser. No. 08/678,584 entitled AUTOMOTIVE TRANSMISSION MOUNT filed Jul. 11, 1996, now U.S. Pat. No. 5,788,206 which is a continuation-in-part of Ser. No. 322,091, filed Oct. 11, 1994, now U.S. Pat. No. 5,551,661 entitled AUTOMOTIVE TRANSMISSION MOUNT issued Sep. 3, 1995. The disclosures of these references are incorporated herein by reference. The present invention relates generally to automotive mounting devices, and more particularly to an automotive transmission mount having interlocking top and bottom plates with a resilient material such as polyurethane disposed therebetween.

BACKGROUND OF THE INVENTION

Automotive transmissions are normally installed in trucks and automobiles by mounting them on a cross-arm attached to the frame of the vehicle. A transmission mount, normally consisting of two horizontal metal plates attached to each other via a rubber-filled core, is inserted between the bottom of the transmission housing and the top of the cross-arm to provide support and shock-absorption for the transmission. In most vehicles, the top plate of the mount is secured to the bottom of the transmission housing by the extension studs or bolts protruding downwardly from the transmission housing in spaced relation into respective openings formed within the top plate. The bottom plate of the mount is secured to the cross-arm attached to the frame of the vehicle. In prior art transmission mounts, the bottom plate typically includes one, two or three studs or bolts protruding therefrom, or alternatively one or more internally threaded apertures formed therein. In those transmission mounts wherein the bottom plate includes one or more bolts extending therefrom, the same are received into respective apertures disposed within the cross-arm. In those transmission mounts wherein the bottom plate includes one or more apertures formed therein, the same are sized and configured to receive respective studs or bolts protruding upwardly from the cross-arm.

In use, the prior art mount is first fastened to the top of the cross-arm by securing its bottom plate to the cross-arm. The transmission is then installed on top of the mount and secured to its top plate, as well as to other parts of the vehicle and its drive-train. Once so assembled, the transmission is firmly braced and supported by the cross-arm through the mount, which also provides shock absorption to alleviate the effects of vibrations during the operation of the vehicle.

One example of a prior art automotive transmission mount is disclosed in U.S. Pat. No. 5,251,865, issued to Kelly on Oct. 12, 1993. The Kelly patent discloses a transmission mount having a rubber core disposed intermediate a top plate configured for attachment to the transmission housing and a bottom plate configured for attachment to the supporting cross-arm of the vehicle frame.

Although such prior art automotive transmission mounts have proven generally suitable for their intended purposes, they possess inherent deficiencies which detract from their overall effectiveness in the marketplace. One example of such an inherent deficiency is readily apparent in the Kelly device wherein the upper and lower plates thereof do not interlock. Thus, deterioration and/or debonding of the rubber disposed therebetween can result in complete detachment of the upper plate from the lower plate, thereby rendering the Kelly automotive transmission mount ineffective.

Additionally, the Kelly automotive transmission mount, as is typical of prior art automotive transmission mounts, utilizes rubber as the resilient material thereof. As is well known to those skilled in the art, rubber is susceptible to degradation due to various environmental factors, such as contamination by various automotive fluids, e.g., gasoline, oil, transmission fluid, brake fluid, etc., as well as ozone and other atmospheric pollutants. Furthermore, rubber is incapable of applying a substantial preload to the upper and lower plates, so as to both desirably increase the stiffness of the mount and similarly increase the durability thereof.

As such, although the prior art has recognized to a limited extent the problem of bracing and supporting automotive transmissions to the frame cross-arm of a vehicle, the proposed solutions have, to date, been ineffective in providing a satisfactory remedy.

SUMMARY OF THE INVENTION

In accordance with the present invention, there is provided an automotive transmission mount comprising a top plate which is configured for attachment to a transmission housing and defines top and bottom surfaces. In addition to the top plate, the transmission mount of the present invention comprises a bottom plate which is configured for attachment to a vehicle frame, and in particular the cross-arm of the frame. Disposed between the top and bottom plates is a resilient material which includes an upper section positioned between the top and bottom surfaces of the top plate. The transmission mount of the present invention further comprises a compression plate which is configured to be positioned between the top plate and the transmission housing. The compression plate is used to facilitate the compression of the upper section of the resilient material so as to apply a pre-load to the bottom plate when the transmission mount is attached to the transmission housing.

The upper section of the resilient material preferably defines first and second regions which are identically configured and separated by a trough. In particular, the first and second regions each preferably include a generally planar end surface which is circumvented by a beveled surface. In this respect, the trough is partially defined by the beveled surfaces of the first and second regions. The resilient material preferably comprises polyurethane which is molded between the top and bottom plates. Polyurethane is preferably used for the resilient materials since it is highly resistent to degradation caused by environmental factors such as contamination via gas, oil, transmission fluid, brake fluid, power steering fluid, etc.

In the preferred embodiment, the top and bottom plates of the transmission mount are configured to interlock with each other. In this respect, the top plate comprises a first section which defines the top surface and includes a pair of apertures disposed therein. More particularly, the first section of the top plate itself comprises a pair of flange portions which collectively define the top surface, with the apertures being disposed within respective ones of the flange portions. In addition to the first section, the top plate comprises a downwardly bent second section which defines the bottom surface and includes an oblong window formed therein. More particularly, the second section itself comprises a pair of inclined sidewall portions which extend downwardly from respective ones of the flange portions of the first section, and a bottom wall portion which extends in generally co-planar relation to the flange portions and defines the bottom surface of the second section. In this respect, the oblong window is formed in the bottom wall portion of the second section. Additionally, the upper section of the resilient material is positioned between the sidewall portions of the second section, and does not protrude beyond the flange portions of the first section.

The bottom plate of the transmission mount itself comprises a stem portion which has an oblong flange formed thereon. The oblong flange is complementary to the oblong window, and is sized to be extensible therethrough. To facilitate the interlock of the top and bottom plates to each other, the oblong flange is extended through the oblong window and angularly off-set relative thereto in a manner facilitating the capture of the oblong flange by the second section of the top plate, and more particularly the bottom wall portion thereof.

Advantageously, the interlock of the top and bottom plates prevents the same from separating from one another despite any degradation/failure of the resilient material disposed therebetween. As such, the automotive transmission mount constructed in accordance with present invention will continue to function in its intended manner even if there is a failure of the resilient material within the mount. The top and bottom plates are each preferably fabricated from steel, though other materials may be utilized as an alternative.

The compression plate included in the transmission mount of the present invention comprises a pair of end portions, each of which has an aperture disposed therein. In addition to the end portions, the compression plate includes a recessed central portion. The end portions are captured between the flange portions of the first section of the top plate and the transmission housing when the transmission mount is attached thereto, with the apertures of the end portions being coaxially aligned with respective ones of the apertures of the flange portions, and the central portion applying compressive pressure to the upper section of the resilient material.

The automotive transmission mount constructed in accordance with the present invention may further comprise an adaptor plate for facilitating the attachment of the transmission mount to the transmission housing. In accordance with a first embodiment of the present invention, the adaptor plate has a generally rectangular configuration and includes a first pair of internally threaded apertures which are disposed in coaxial alignment with respective ones of the apertures within the flange portions of the first section of the top plate and the end portions of the compression plate. The adaptor plate further includes a second pair of apertures which are disposed outwardly relative to the flange portions of the first section of the top plate.

In accordance with a second embodiment of the present invention, the adaptor plate has a generally rectangular configuration and includes a first pair of apertures which are disposed in coaxial alignment with respective ones of the apertures within the flange portions of the first section of the top plate and the end portions of the compression plate. In addition to the first pair of apertures, the adaptor plate includes a second pair of apertures which are disposed outwardly relative to the flange portions of the first section of the top plate, and a pair of inwardly bent flange portions having a third pair of apertures disposed therein which are coaxially aligned with respective ones of the apertures of the second pair.

The application of the pre-load to the flange of the bottom plate facilitated by the compression of the resilient material eliminates the need for adhesively bonding the resilient material to the top and bottom plates. The automotive transmission mount of the present invention is preferably manufactured by placing the interlocked top and bottom plates into a mold, and subsequently injecting polyurethane into the mold. Thus, the top and bottom plates are configured so as to be locked together prior to the injection molding of the polyurethane thereabout.

BRIEF DESCRIPTION OF THE DRAWINGS

These, as well as other features of the present invention, will become more apparent upon reference to the drawings wherein:

FIG. 3 is a top perspective view of an adaptor plate constructed in accordance with a first embodiment of the present invention which may be used with the transmission mount shown in FIGS. 1 and 2; and FIGS. 4 and 5 show a top perspective view of an adaptor plate constructed in accordance with a second embodiment of the present invention which may be used with the transmission mount shown in FIGS. 1 and 2.

DETAILED DESCRIPTION OF THE PREFERRED EMBODIMENTS

Figure 1:
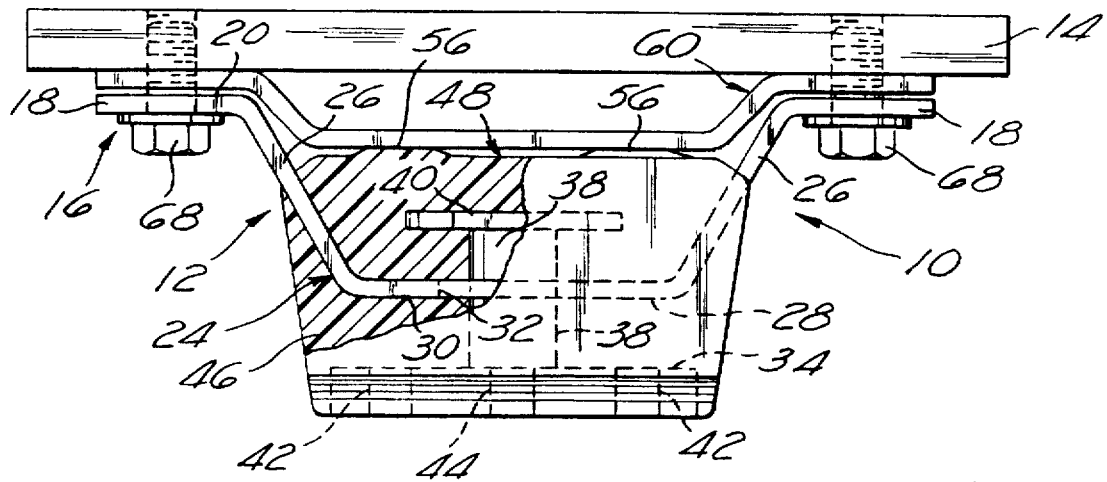
FIG. 1 is a partial cross-sectional view of the automotive transmission mount constructed in accordance with the present invention.
Figure 2:
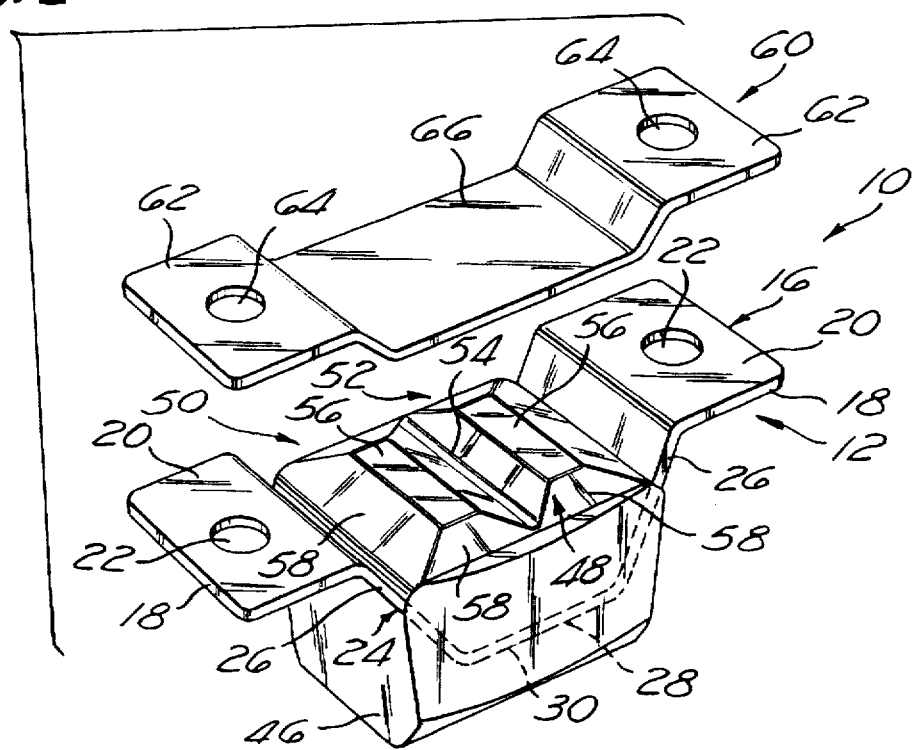
FIG. 2 is an exploded view of the transmission mount shown in FIG. 1.

Referring now to the drawings wherein the showings are for purposes of illustrating preferred embodiments of the present invention only, and not for purposes of limiting the same, FIG. 1 illustrates the automotive transmission mount 10 constructed in accordance with the present invention. Referring now to FIGS. 1 and 2, the transmission mount 10 comprises a top plate 12 which is configured for attachment to a transmission housing 14, as shown in FIG. 1. In the preferred embodiment, the top plate 12 comprises a first section 16 which itself includes an opposed pair of identically configured, outwardly extending flange portions 18. The flange portions 18 each define a generally planar top surface 20, with the top surfaces 20 of the flange portions 18 collectively defining the top surface of the top plate 12. Disposed within respective ones of the flange portions 18 is a pair of apertures 22, the use of which will be discussed in more detail below.

In addition to the first section 16, the top plate 12 of the transmission mount 10 includes a downwardly bent second section 24 which itself comprises a pair of inclined sidewall portions 26 extending downwardly from respective ones of the flange portions 18. In addition to the sidewall portions 26, the second section 24 includes a bottom wall portion 28 which defines a generally planar bottom surface 30. In this respect, the bottom surface 30 of the bottom wall portion 28 defines the bottom surface of the top plate 12. Formed in the bottom wall portion 28 of the second section 24 is an oblong window 32 which is preferably provided in the general shape of a circle having two flat sides, i.e., cords of the circle, formed thereon. The top plate 12 is preferably fabricated from steel, though other materials may be utilized as an alternative.

In addition to the top plates 12, the transmission mount 10 of the present invention comprises a bottom plate 34 which is configured for attachment to a vehicle frame, and in particular the cross-arm of the vehicle. As seen in FIG. 1, the bottom plate 34 includes a rectangularly configured base portion 36 having a tubular, cylindrically configured stem portion 38 rigidly attached to and extending perpendicularly from the center of one side thereof. Formed on the distal end of the stem portion 38 is an oblong flange 40 which has a configuration complementary to that of the oblong window 32, and is sized to be extensible therethrough. Both the base portion 36 and the stem portion 38 of the bottom plate 34 are preferably fabricated from steel, with the stem portion 38 being attached to the base portion 36 via a weld. Disposed within the base portion 36 on opposed sides of the stem portion 38 is a pair of internally threaded apertures 42. Additionally, disposed within the approximate center of the base portion 36 is an internally threaded aperture 44 which communicates with the hollow interior of the stem portion 38. The apertures 42, 44 are linearly aligned within the base portion 36.

As further seen in FIG. 1, in the preferred embodiment of the present invention, the top and bottom plates 12, 34 are adapted to interlock with each other. Such interlock is facilitated by the extension of the oblong flange 40 through the oblong window 32 and subsequent rotation of the base portion 36 so as to angularly off-set the flange 40 and window 32 relative to each other. In this respect, when the top and bottom plates 12, 34 are properly interlocked, the opposed, lateral ends of the base portion 36 extend toward the flange portions 18 of the first section 16 of the top plate 12. When the base portion 36 is oriented in this manner, the flange 40 is off-set by approximately 90 degrees relative to the window 32. Thus, to facilitate the extension of the flange 40 through the window 32, the base portion 36 must be initially oriented such that the arcuate ends of the flange 40 are aligned with the arcuate ends of the window 32, i.e., the lateral ends of the base portion 36 extend perpendicularly relative to the outwardly extending flange portions 18 of the first section 16. Subsequent to the extension of the flange 40 through the window 32, the rotation of the base portion 36 approximately 90 degrees facilitates the desired extension of the lateral ends thereof toward the flange portions 18, and the resultant interlock of the top and bottom plates 12, 34 to each other. As will be recognized, when the base portion 36 is oriented in this manner, the separation of the top and bottom plates 12, 34 is prevented by the capture of the flange 40 by the second section 24 of the top plate 12, and in particular the bottom wall portion 28 thereof.

As further seen in FIGS. 1 and 2, the transmission mount 10 of the present invention further comprises a mass 46 of resilient material which is disposed between the interlocked top and bottom plates 12, 34. The resilient material comprising the mass 46 is preferably polyurethane which is molded between the top and bottom plates 12, 34. Advantageously, the formation of the mass 46 from polyurethane provides resistance to its degradation from soiling, environmental contamination, and exposure to automotive fluids such as petroleum products (e.g., gasoline, oil, transmission fluid, brake fluid, power steering fluid, etc.).

Though the top and bottom plates 12, 34 of the transmission mount 10 are interlocked when the polyurethane mass 46 is molded therebetween, they do not directly contact each other. In this respect, as seen in FIG. 1, the mass 46 is formed between the second section 24 of the top plate 12, and the base portion 36, stem portion 38 and flange 40 of the bottom plate 34. In addition to completely encapsulating the stem portion 38 and flange 40, the mass 46 substantially encapsulates the base portion 36, except for the outer side thereof. In view of the manner in which the mass 46 is formed between the interlocked top and bottom plates 12, 34, the stem portion 38 resides within the window 32, with the flange 40 being separated from the second section 24, and more particularly the bottom wall portion 28 thereof, by the mass 46.

The polyurethane mass 46 further includes an upper section 48 which is positioned between the top and bottom surfaces of the top plate 12. More particularly, the upper section 48 is positioned between the sidewall portions 26 of the second section 24, and does not protrude beyond the flange portions 18 of the first section 16. In this respect, the top end of the upper section 48 is oriented well below the flange portions 18. The upper section 48 itself preferably defines identically configured first and second regions 50, 52 which are separated by a trough 54. The first and second regions 50, 52 each include a generally planar end surface 56 which is circumvented by a beveled surface 58. In this respect, the trough 54 is partially defined by portions of the beveled surfaces 58 of the first and second regions 50, 52.

The transmission mount 10 of the present invention further comprises a compression plate 60 which is normally positioned between the top plate 12 (i.e., the top surfaces 20 of the flange portions 18) and the transmission housing 14 for compressing the upper section 48 of the mass 46 so as to apply a pre-load to the bottom plate 34 when the transmission mount 10 is attached to the transmission housing 14. In the preferred embodiment, the compression plate 60 has a generally rectangular configuration and comprises an opposed pair of identically configured, generally planar end portions 62, disposed within respective ones of the end portions 62 is a pair of apertures 64 which are coaxially aligned with respective ones of the apertures 22 of the top plate 12 when the end portions 62 of the compression plate 60 are properly oriented upon the flange portions 18. Formed between the end portions 62 is a recessed central portion 66. The central portion 66 is itself adapted to compress the upper section 48 of the mass 46 when the compression plate 60 is properly captured between the top plate 12 and transmission housing 14.

The transmission mount 10 of the present invention is attached to the cross-arm of the vehicle frame by the receipt of studs or bolts extending upwardly from the cross-arm into respective ones of the internally threaded apertures 42, 44 of the bottom plate 34, and in particular the base portion 36 thereof. The top plate 12 is attached to the transmission housing 14 subsequent to the placement of the end portions 62 of the compression plate 60 upon the flange portions 18 such that the apertures 22, 64 are coaxially aligned with each other, and the central portion 66 rests upon the upper section 48 of the mass 46. Thereafter, fasteners 68 such as bolts are extended upwardly through the coaxially aligned apertures 22, 64 and into complementary, internally threaded apertures disposed within the transmission housing 14. Importantly, the tightening of the fasteners 68 facilitates the rigid capture of the end portions 62 between the flange portions 18 and transmission housing 14, and the resultant compression of the upper section 48 of the mass 46 by the central portion 66 of the compression plate 60.

As previously indicated, the compression of the upper section 48 of the mass 46, and in particular the first and second regions 50, 52 thereof, by the compression plate 60 facilitates the application of a pre-load to the bottom plate 34. Such pre-load is applied primarily to the flange 40 disposed on the distal end of the stem portion 38 of the bottom plate 34. In the transmission mount 10, the mass 46 is only mechanically bonded to the stem portion 48 and flange 40 of the bottom plate 34. As such, the bottom plate 34 is free-floating and will tend to move and loosen if the pre-load is not applied thereto. Thus, in the transmission mount 10, the inclusion of the upper section 48 of the mass 46, and in particular the first and second regions 50, 52 thereof, serves an important purpose in the functionality of the mount 10.

Referring now to FIG. 3, the transmission mount 10 constructed in accordance with the present invention may be used in conjunction with an adaptor plate 70 for facilitating the attachment of the mount 10 to the transmission housing 14. The adaptor plate 70 has a generally rectangular configuration, and includes a first pair of internally threaded apertures 72 disposed therewithin. The adaptor plate 70 is used with the transmission mount 10 by extending the adaptor plate 70 over the end portions 62 of the compression plate 60. In this respect, the apertures 72 are oriented so as to be coaxially aligned with respective pairs of the apertures 22, 64 of the top plate 12 and compression plate 60 when the adaptor plate 70 is properly oriented upon the end portions 62. Subsequent to the placement of the adaptor plate 70 upon the end portions 62, fasteners such as bolts are extended through the coaxially aligned pairs of apertures 22, 64 and into respective ones of the internally threaded apertures 72 of the adaptor plate 70.

The subsequent tightening of the fasteners used to attach the transmission mount 10 to the adaptor plate 70 facilitates the compression of the mass 46 in the same manner as previously described in relation to the attachment of the transmission mount 10 directly to the transmission housing 14. In addition to the apertures 72, the adaptor plate 70 includes a pair of apertures 74 which are disposed outwardly relative to the end portions 62 and flange portions 18 when the adaptor plate 70 is properly oriented upon the transmission mount 10. The apertures 74 are used to accommodate fasteners such as bolts for facilitating the attachment of the adaptor plate 70, and hence the transmission mount 10, to a transmission housing.

Referring now to FIG. 4, there is depicted an adaptor plate 76 which is constructed in accordance with a second embodiment of the present invention and may be used with the transmission mount 10 as an alternative to the previously described adaptor plate 70. The adaptor plate 76 also has a generally rectangular configuration, and includes a main body portion 78 having a first pair of apertures 80 disposed therein. The adaptor plate 76 is used with the transmission mount 10 by initially placing the main body portion 78 thereof upon the end portions 62 of the compression plate 60. Like the previously described apertures 72, the apertures 80 are oriented so as to be coaxially aligned with respective pairs of the coaxially aligned apertures 22, 64 when the adaptor plate 76 is properly oriented upon the end portions 62.

In addition to the apertures 80, the adaptor plate 76 of the second embodiment includes a second pair of apertures 82 which, like the apertures 74 of the adaptor plate 70, are disposed outwardly relative to the end portions 62 and flange portions 18 when the adaptor plate 76 is properly oriented upon the transmission mount 10. The adaptor plate 76 further includes a pair of identically configured, inwardly bent flange portions 84. Disposed within the flange portions 84 is a third pair of apertures 86 which are coaxially aligned with, but smaller in diameter than, respective ones of the apertures 82 of the second pair.

The adaptor plates 70, 76 are typically used to interface the transmission mount 10 to the transmission housings of different makes of vehicles. When the adaptor plate 70 is utilized, bolts are extended upwardly through the apertures 74 and threadably received into the transmission housing. Similarly, when the adaptor plate 76 is used, bolts are extended upwardly through the apertures 82, 86 and into the transmission housing. The optional use of the adaptor plates 70, 76 with the transmission mount 10 provides the same with virtually universal adaptability to different makes of vehicles to facilitate the interface of the transmission to the cross-arm of the vehicle frame.

As previously explained, the application of the pre-load to the bottom plate 34 facilitated by the compression of the first and second regions 50, 52 of the upper section 48 prevents excessive movement and loosening of the bottom plate 34 when the transmission mount 10 is functioning to dampen vibrations. Importantly, even in the event that the polyurethane mass 46 cracks, ruptures or otherwise fails within the transmission mount 10, the interlock of the top and bottom plates 12, 34 to each other in the aforementioned manner prevents the same from being separated despite the failure of the mass 46. As such, the reliability of the transmission mount 10 constructed in accordance with the present invention is substantially increased since any failure of the mass 46 does not result in the separation of the top and bottom plates 12, 34 from each other. The application of the pre-load further eliminates the need to adhesively bond the mass 46 to the top and bottom plates 12, 34.

The transmission mount 10 constructed in accordance with the present invention is preferably formed by initially placing the top and bottom plates 12, 34 into a suitable mold subsequent to the interlock thereof in the aforementioned manner. Thereafter, polyurethane material is injected into the mold, and subsequently cooled so as to form the mass 46.

Additional modifications and improvements of the present inventions may also be apparent to those skilled in the art. For example, various configurations of the top, bottom and compression plates 12, 34, 60 are contemplated, with the various apertures disposed within such plates being capable of orientation in varying patterns for adaptability with the transmissions and vehicle frames of different makes of vehicles. As such, the particular combination of parts described and illustrated herein is intended to represent only certain embodiments of the present invention, and is not intended to serve as limitations of alternative devices within the spirit and scope of the invention.

What is claimed is:

1. An automotive transmission mount, comprising:

a top plate configured for attachment to a transmission housing and defining top and bottom surfaces;

a bottom plate configured for attachment to a vehicle frame;

a resilient material disposed between the top and bottom plates and including an upper section which is positioned between the top and bottom surfaces of the top plate; and a compression plate configured to be positioned between the top plate and the transmission housing for compressing the upper section of said resilient material so as to apply a pre-load to said bottom plate when the transmission mount is attached to the transmission housing.

2. The mount of claim 1 wherein the upper section of the resilient material defines first and second regions which are separated by a trough.

3. The mount of claim 2 wherein said first and second regions are identically configured.

4. The mount of claim 2 wherein said first and second regions each include a generally planar end surface which is circumvented by a beveled surface, said trough being partially defined by portions of the beveled surfaces of the first and second regions.

5. The mount of claim 1 wherein said resilient material comprises polyurethane.

6. The mount of claim 5 wherein the polyurethane is molded between the top and bottom plates.

7. The mount of claim 1 wherein said top and bottom plates are configured to interlock with each other.

8. The mount of claim 7 wherein the top plate includes an oblong window formed therein and the bottom plate includes an oblong flange formed thereon which is extended through the oblong window and angularly off-set relative thereto so as to interlock said top plate and said bottom plate.

9. The mount of claim 7 wherein:

the top plate comprises a first section which defines the top surface and includes a pair of apertures disposed therein, and a downwardly bent second section which defines the bottom surface and includes a window formed therein;

said bottom plate comprises a stem portion having a flange formed thereon; and said stem portion is received within the window such that said flange is captured by the second section of said top plate.

10. The mount of claim 9 wherein:

the window formed in the second section of the top plate has an oblong shape;

the flange formed on the stem portion of the bottom plate has an oblong shape which is complementary to the window and sized to be extensible therethrough; and the flange is extended through the window and angularly off-set relative thereto in a manner facilitating the capture of the flange by the second section of the top plate.

11. The mount of claim 9 wherein:

the first section of the top plate comprises a pair of flange portions which collectively define the top surface, said apertures being disposed within respective ones of the flange portions; and said downwardly bent second section comprises a pair of inclined sidewall portions which extend downwardly from respective ones of the flange portions, and a bottom wall portion which extends in generally co-planar relation to the flange portions and defines the bottom surface, said window being formed in the bottom wall portion;

said upper section of the resilient material being positioned between the sidewall portions of the second section and not protruding beyond the flange portions of the first section.

12. The mount of claim 11 wherein the compression plate comprises:

a pair of end portions, each of said end portions having an aperture disposed therein; and a recessed central portion;

said end portions being captured between the flange portions of the first section of the top plate and the transmission housing when the transmission mount is attached thereto, with the apertures of the end portions being coaxially aligned with respective ones of the apertures of the flange portions and the central portion applying compressive pressure to the upper section of the resilient material.

13. The mount of claim 12 further comprising an adaptor plate for facilitating the attachment of the transmission mount to the transmission housing.

14. The mount of claim 13 wherein said adaptor plate has a generally rectangular configuration and includes:

a first pair of apertures which are disposed in coaxial alignment with respective ones of the apertures within the flange portions of the first section of the top plate and the end portions of the compression plate; and a second pair of apertures which are disposed outwardly relative to the flange portions of the first section of the top plate.

15. The mount of claim 14 wherein the apertures of the first pair are each internally threaded.

16. The mount of claim 13 wherein said adaptor plate has a generally rectangular configuration and includes:

a first pair of apertures which are disposed in coaxial alignment with respective ones of the apertures within the flange portions of the first section of the top plate and the end portions of the compression plate;

a second pair of apertures which are disposed outwardly relative to the flange portions of the first section of the top plate; and a pair of inwardly bent flange portions including a third pair of apertures disposed therein which are coaxially aligned with respective ones of the apertures of the second pair.

17. An automotive transmission mount, comprising:

a top plate configured for attachment to a transmission housing and defining top and bottom surfaces;

a bottom plate configured for attachment to a vehicle frame, the bottom plate being interlocked with the top plate to prevent the separation of the top and bottom plates from each other;

a resilient material disposed between the top and bottom plates and including an upper section which is positioned between the top and bottom surfaces of the top plate; and a compression plate configured to be positioned between the top plate and the transmission housing for compressing the upper section of said resilient material so as to apply a pre-load to the bottom plate when the transmission mount is attached to the transmission housing.

* * * * *